United States Patent Office 2,798,779
Patented July 9, 1957

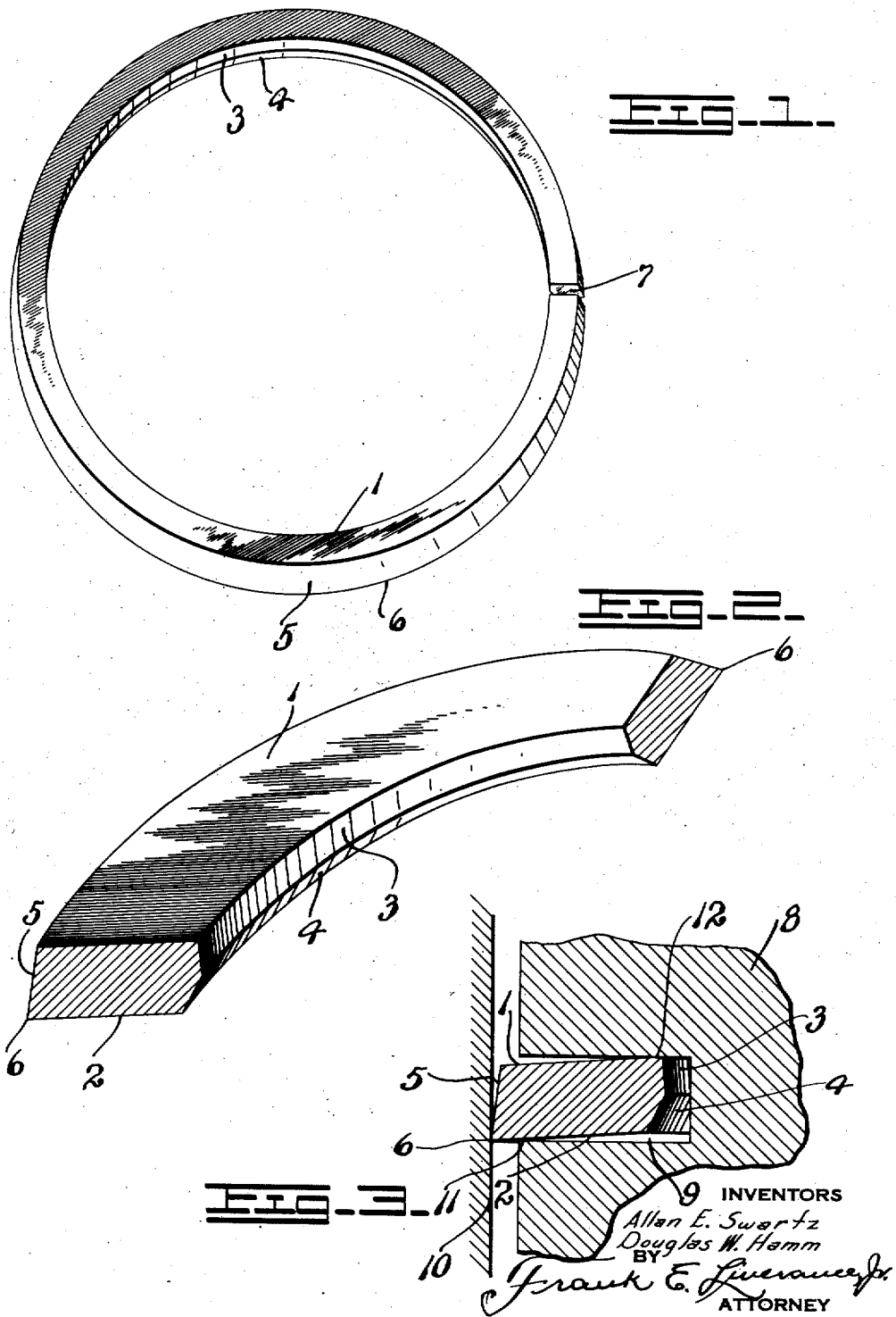

2,798,779

REVERSE DISH ACTION PISTON RING

Allan E. Swartz and Douglas W. Hamm, Muskegon, Mich., assignors to Muskegon Piston Ring Company, Muskegon, Mich., a corporation of Michigan Application April 2, 1956, Serial No. 575,409

4 Claims. (Cl. 309—44)

The present invention is directed primarily to a novel construction of piston ring, known as a compression ring, adapted to be used in the second ring groove from the top of a piston, though it may be used in the top ring groove and can be used in any ring groove, though best serving its purposes when used in the second compression groove.

It is a primary object and purpose of our invention to provide a single piece piston ring, usually of cast iron, which is parted at one side and which when the parting in the ring is closed when installed and used with a piston within a cylinder of an internal combustion engine, because of the cross section of the ring, twists or distorts from its normal form, whereby the lower side of the ring bears against the bottom of the piston ring groove in which located at the outer part of the groove, inclining upwardly and inwardly therefrom. At its upper side it bears against the top of the piston ring groove at the inner portion of the ring, including downwardly and outwardly from such point of contact. The outer curved bearing surface of the ring is inclined upwardly and inwardly from its lower side at an acute angle to the vertical, the ring at its lower outer corner portion having an annular lip or edge coming against the inner surface of the cylinder wall to scrape excess oil downwardly on the downstroke of the piston.

With a ring structure of this type a better seal against escape or passage of oil upwardly past the ring is attained, it being particularly effective under conditions of high vacuum. The seal against the entrance of oil into a piston ring groove, from which it may pass upwardly and around the inner diameter of the ring, is based upon the fact that the oil is prevented from entering the groove initially and does not have to be sealed against passage as it does when oil can enter the ring groove. Oil economy is enhanced under extreme driving conditions, as where there may be a great deal of down hill coasting and frequent stop-and-go driving.

An understanding of the invention for the attainment of the beneficial results stated may be had from the following description, taken in connection with the accompanying drawing, in which, Fig. 1 is a perspective view of a piston ring made in accordance with our invention.

Fig. 2 is a fragmentary enlarged section of such ring in perspective, and

Fig. 3 is a fragmentary vertical section through a piston installed within a cylinder, the piston ring of our invention being shown as in use within a piston ring groove.

The piston ring of our invention is of normal, generally circular form, parted and open at one side as usual, the ring taking a substantially circular form when closed at the parting. Such ring has parallel flat upper and lower sides 1 and 2. It has an inner curved side section 3, which may be located generally perpendicular to the planes of the sides 1 and 2. The ring cross section is cut away below such portion 3 to provide a downwardly and outwardly inclined inner curved side section 4, the lower inner corner portion of the ring being removed so that the ring is not rectangular in cross section as it would be if the inner side portion 3 was substantially continued from the upper to the lower side of the ring. Other specific manners of getting equivalent non-rectangular ring cross sections will occur to those skilled in the art. At its outer curved edge it is machined, as indicated at 5, so that such outer curved side 5 inclines upwardly and inwardly from the lower side 2, there being thus provided an annular scraping lip or edge 6 at the juncture of the lower flat side 2 and the outer curved side 5 as shown. The parting at one side of the ring is shown at 7 in Fig. 1.

The ring is adapted to be installed in connection with a generally vertically reciprocating piston 8 of a vertical or inclined V-cylinder internal combustion engine, being placed in a ring groove 9 thereof with the lip or edge 6 pressing against the inner side of the cylinder 10. The ring is closed at its parting thereby generating a tension force which tends to open the ring at the parting so that the lip or edge 6 presses with a predetermined unit pressure against the cylinder.

In closing such ring, because of the cross section of the ring, what follows, from the described upper and lower flat sides 1 and 2, the inner curved sections 3 and 4 and the outer curved surface 5 with edge or lip 6, is that the ring will tend to twist or warp from a horizontal plane and become dished as exaggeratedly shown in Fig. 3, it being understood that the vertical dimension on width of the ring groove 9 is a few thousandths of an inch greater than the vertical distance between the upper and lower flat sides 1 and 2 of the ring. Such dishing tilts the ring so that its outer lip or edge 6 is at the lowest part of the ring, the lower side 2 inclining upwardly and inwardly while the parallel upper side 1 inclines downwardly and outwardly. The lower side 2 of the ring bears against the lower side of the groove 9, as at 11 (Fig. 3), at the outer portion of said groove while the upper side 1 comes against the upper side of the ring groove at 12 adjacent the inner portion of said side 1. The disclosure in Fig. 3 exaggerates the spaces between the sides of the ring and the adjacent sides of the ring groove and also that between the outer surface of the piston and the adjacent cylinder wall.

With such construction of the piston ring an effective seal preventing entrance of oil to any degree or extent into the groove 9 is provided. On the downstroke of the piston, the lip or edge 6 riding against the cylinder wall 10, will scrape the oil ahead of it and the oil is forced downwardly between the piston and the cylinder wall and prevented, by the sealing engagement at 11, from entering the ring groove. On the upstroke of the piston, scraping of oil from the cylinder wall does not take place and there is no danger of oil to any amount entering the ring groove.

The amount of taper turned on the ring at its outer curved side resulting in the scraping lip or edge 6 with our invention is sufficient to insure the bottom bearing of the ring as at 6 (Fig. 3). In other words, the downward and outward taper of the curved outer surface 5 of the ring is sufficient not only to eliminate the opposite effect of what would take place if such curved edge 5 was at right angles to the upper and lower sides of the ring upon dishing the ring, but is added to it, so that the scraping lip or edge 6 of the ring is at the lower outside corner and not at the upper outside corner as would be the case if the side 5 was perpendicular to the upper and lower flat sides 1 and 2.

With the structure described, improved oil economy is attained both under normal and extreme driving conditions. With it tail pipe smoke is controlled under severe driving conditions. The ring is of particular benefit and has its greatest usefulness in the compression ring groove next below the top compression groove in a piston. In such second groove the explosion and other compression pressures from the combustion chamber which tend to flatten the ring so that its under side will be flat against the lower side of such upper ring groove are not present in sufficient magnitude to cause such flattening. Therefore, the ring in the second compression ring groove tends to take generally the position shown in Fig. 3, securely sealing against oil troubles in connection with upward passage of lubricating oil getting into the groove at any time.

The invention is defined in the appended claims and is to be considered comprehensive of all forms of structure coming within their scope.

We claim:

1. A single piece parted piston ring normally having parallel horizontal upper and lower flat sides, and an inner curved side with a lower annular portion removed whereby when the parting in said ring is closed, the ring is distorted in form to incline said upper and lower sides thereof upwardly and inwardly at a small acute angle to the horizontal, said ring at its outer curved side extending upwardly and inwardly at an acute angle to the vertical in both normal and parting closed positions.

2. A piston having a ring receiving groove therein around it, a single piece piston ring, parted at one side, and normally open at said parting in said groove, said ring having upper and lower parallel sides, normally parallel to the upper and lower sides of said groove, and distorted and changed in form on closing the ring parting, whereby the upper side of said ring engages and seals against the upper side of said ring groove adjacent its inner curved side and inclines downwardly and outwardly therefrom, and said lower side of the ring engages and seals against the lower side of said ring groove adjacent the outer open side of said groove, said lower side of the ring inclining upwardly and inwardly therefrom, and said ring at its outer curved side inclining upwardly and inwardly at an angle to the vertical from the lower to the upper sides of said ring.

3. A single piece parted piston ring normally having parallel horizontal upper and lower flat sides, an inner marginal face and an outer marginal face; the entire outer marginal face of said ring being inclined inwardly and upwardly with respect to said lower face; the lower portion of said inner marginal face being undercut adapting said ring when closed to distort and incline said upper and lower sides upwardly and inwardly at a small acute angle to the horizontal; said inclination of said outer marginal face being greater than the inclination of said ring whereby the lower outer edge of said ring is of greater radius than any other portion of said ring.

4. A piston having a circumferential ring receiving groove therein; a single piece parted piston ring normally having parallel horizontal upper and lower flat sides, an inner marginal face and an outer marginal face; the entire outer marginal face of said ring being inclined inwardly and upwardly with respect to said lower face; the lower portion of said inner marginal face being undercut adapting said ring when closed to distort and incline said upper and lower sides upwardly and inwardly at a small acute angle to the horizontal; the intersection of said upper side and of said inner marginal face of said ring engaging and sealing against the upper wall of said ring groove; the lower side of said ring engaging and sealing against the intersection of the outer face of said piston and the lower wall of said ring groove; said inclination of said outer marginal face being greater than the inclination of said ring whereby the lower outer edge of said ring is of greater radius than any other portion of said ring.

References Cited in the file of this patent

UNITED STATES PATENTS

| | | |
|---|---|---|
| 1,327,801 | Blanche | Jan. 13, 1920 |
| 1,546,525 | Wasson | July 21, 1925 |
| 2,459,395 | Smith | Jan. 18, 1949 |
| 2,560,775 | Olsen | July 17, 1951 |
| 2,715,555 | Marien | Aug. 16, 1955 |

Disclaimer 2,798,779.—*Allan E. Swartz* and *Douglas W. Hamm*, Muskegon, Mich. REVERSE DISH ACTION PISTON RING. Patent dated July 9, 1957. Disclaimer filed July 9, 1958, by the assignee, *Muskegon Piston Ring Company*.
Hereby enters this disclaimer to claim 2 of said patent.
[*Official Gazette September 2, 1958.*]